Figure 1:
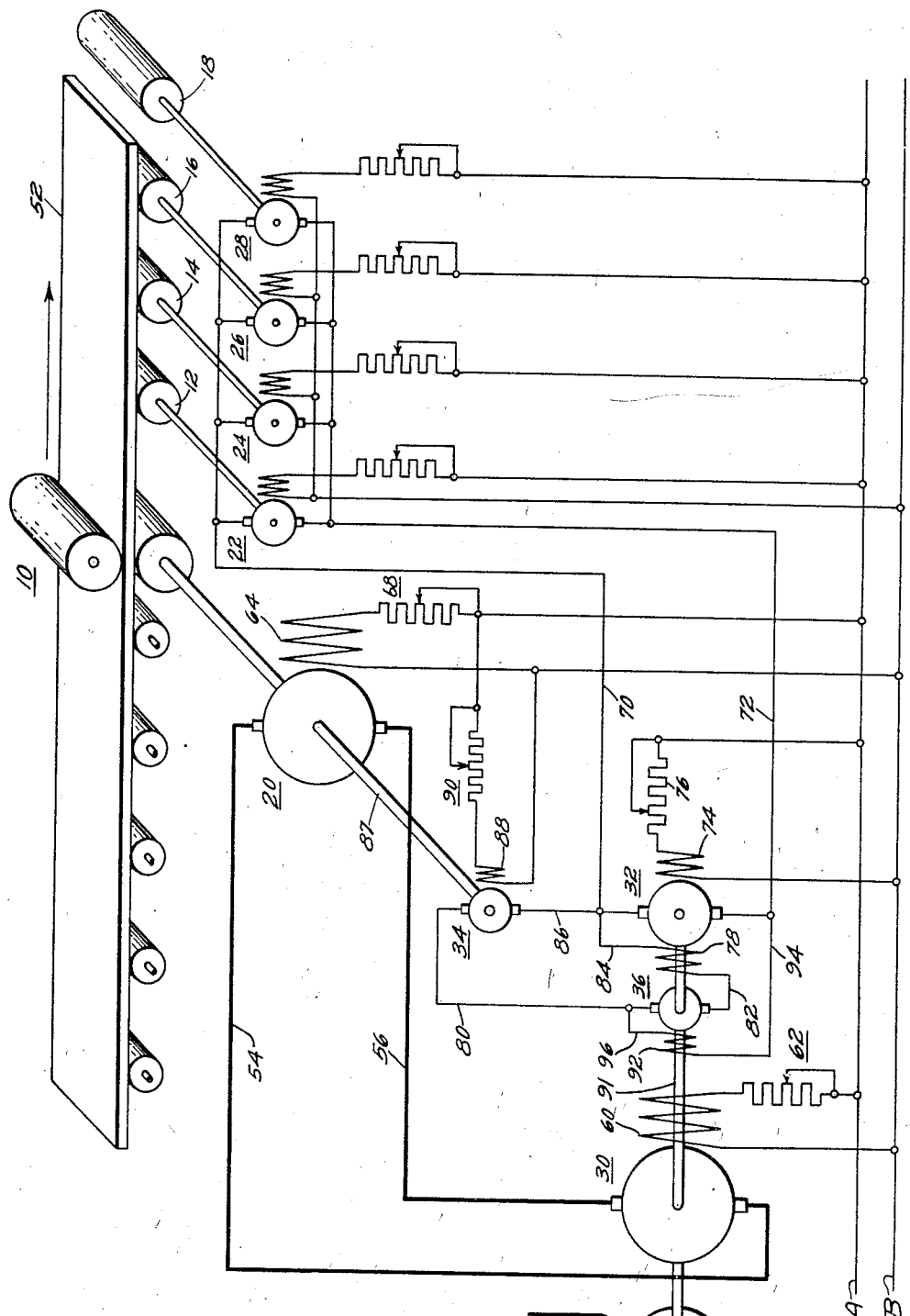

Sept. 2, 1941.  W. G. COOK  2,254,886
CONTROL SYSTEM
Filed April 25, 1939  4 Sheets-Sheet 1

WITNESSES:
C. J. Weller.
Joe Weber

INVENTOR
Willard G. Cook.
BY
J. M. Crawford
ATTORNEY

Sept. 2, 1941. W. G. COOK 2,254,886
CONTROL SYSTEM
Filed April 25, 1939 4 Sheets-Sheet 2

WITNESSES:
C. J. Weller.
Joe Weber

INVENTOR
Willard G. Cook.
BY
J. M. Crawford
ATTORNEY

Sept. 2, 1941.   W. G. COOK   2,254,886
CONTROL SYSTEM
Filed April 25, 1939    4 Sheets—Sheet 3

WITNESSES:
C. J. Weller.
Joe Weber

INVENTOR
Willard G. Cook.
BY
Crawford
ATTORNEY

Sept. 2, 1941. W. G. COOK 2,254,886
CONTROL SYSTEM
Filed April 25, 1939 4 Sheets-Sheet 4

WITNESSES:
C. J. Weller.
Joe Weber

INVENTOR
Willard G. Cook.
BY
G. M. Crawford
ATTORNEY

Patented Sept. 2, 1941

2,254,886

UNITED STATES PATENT OFFICE 2,254,886

CONTROL SYSTEM

Willard G. Cook, Wilkinsburg, Pa., assignor to Westinghouse Electric & Manufacturing Company, East Pittsburgh, Pa., a corporation of Pennsylvania Application April 25, 1939, Serial No. 269,907

18 Claims. (Cl. 172—239)

My invention relates, generally, to control systems and, more particularly, to control systems for maintaining a desired relation between the output potentials of a plurality of generators.

In the operation of two or more associated work devices between whose speeds it is desired to maintain a desired relationship, it is common practice to drive one of the devices by a motor whose armature is energized by a continuously-driven generator the output potential of which is varied by varying its excitation in accordance with the speed of the other device. Thus as the speed of the second mentioned of these devices is varied, the armature energization of the first mentioned device is varied to vary the speed of the first device accordingly.

This method of maintaining the desired speed relationship between work devices has been applied to rolling mills where the reel motor or run-out table motors are energized by a continuously driven main generator, the excitation of the main generator being provided by a continuously excited pilot generator driven by the mill roll motor and thus exciting the main generator in accordance with the speed of the mill motor. It will be understood that the output potential of the main generator will be proportional to the output potential of the pilot generator and the speeds of the reel motor or table roll motors and the mill motor will have the same relationship.

This system has the disadvantage however that during periods of acceleration and deceleration of the mill the potential of the main generator does not maintain the proportional relationship with the potential of the pilot generator due to the fact that the main generator, being a relatively large machine, has a field winding of relatively high inductance and this causes a considerable time lag between a given change in the potential of the pilot generator and the potential of the main generator which is controlled by the potential of the pilot generator. Thus the desired speed relationship of the mill roll, reel, and table roll motors will not be maintained during acceleration and deceleration periods of a rolling mill controlled by this system.

It is the object of the invention, therefore, to provide a control system for a plurality of work devices which shall function to maintain a desired speed relation between the work devices regardless of the acceleration and deceleration of the devices.

Another object of the invention is to provide a control system for a plurality of generators which shall function to maintain a predetermined selectable proportional relationship between the output potentials of the generators.

A further object of the invention is to provide a control system for a plurality of motors which shall function to maintain a predetermined selectable speed relation between the motors.

Figure 2:
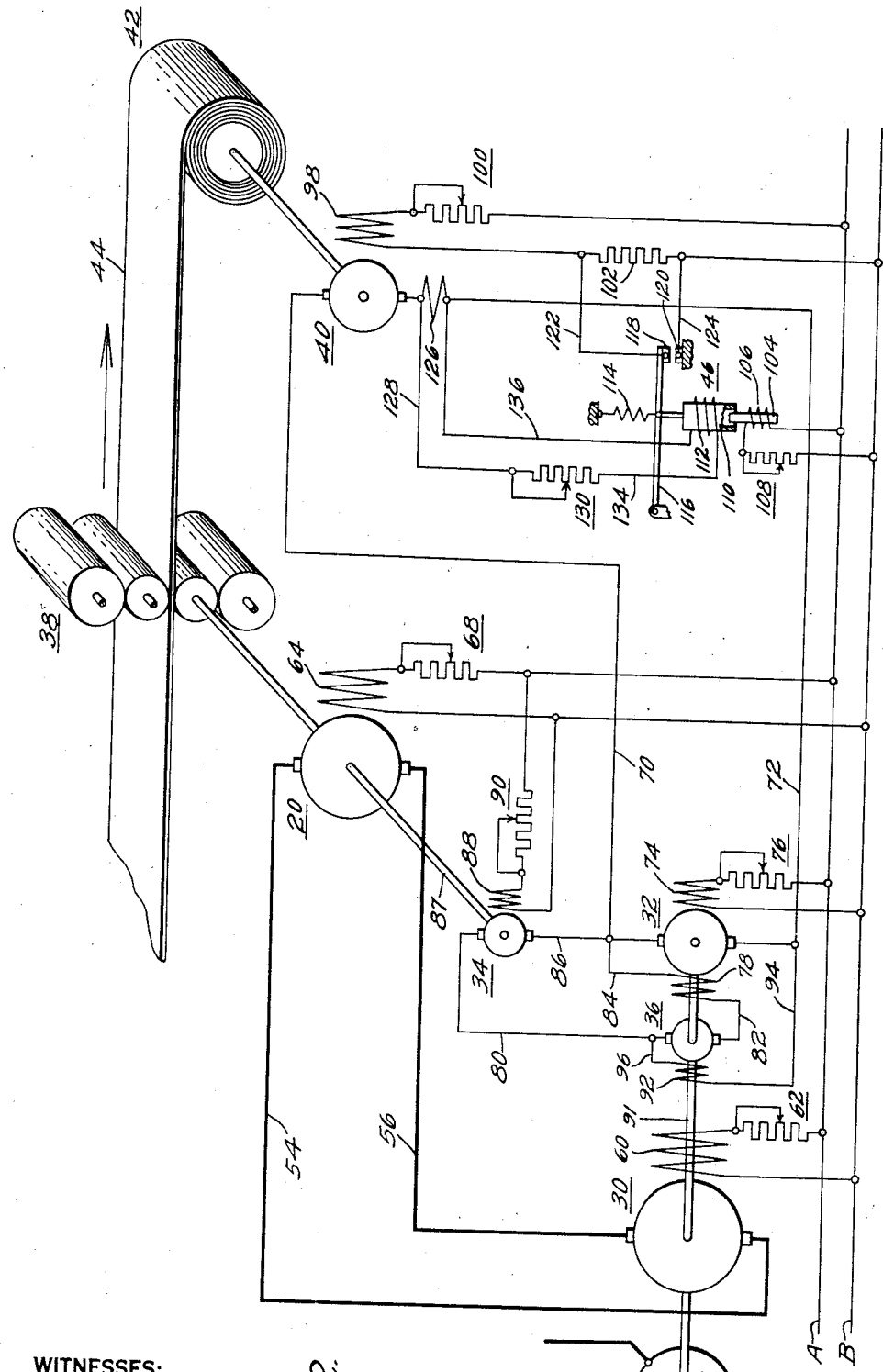

These and other objects and advantages of the invention will be apparent from the following detailed description taken in connection with the accompanying drawings in which like reference characters are used to designate identical and similar elements of structure and in which, Figure 1 is a diagrammatic view of a control system for a portion of a rolling mill embodying the principal features of my invention, Fig. 2 is a diagrammatic view of a control system for a portion of a strip rolling mill embodying the principal features of my invention, and Figs. 3, 4, 5 and 6 are diagrammatic views of other embodiments of my invention.

In the embodiment of my invention shown in Fig. 1, the reducing rolls 10 and the run-out table rolls, 12, 14, 16, and 18 of a rolling mill are provided with drive motors 20, 22, 24, 26 and 28, respectively. The roll motor 20 is connected to be energized by a generator 30 whose output potential may be varied to control the speed of the motor 20.

The table roll motors 22, 24, 26 and 28 are connected to be energized by a generator 32 whose excitation is varied in accordance with the speed of the roll motor 20 by connecting one of its field windings to be energized by a pilot generator 34 driven by the motor 20. Field forcing of the generator 32 is provided by a pilot generator 36 which is connected to vary the excitation of the generator 32 in accordance with the difference between the output potentials of the generators 32 and 34.

In the embodiment of the invention shown in Fig. 2, the roll motor 20 drives the rolls of a strip rolling mill and the generator 32 energizes a motor 40 which drives a reel 42 for winding the strip 44 as it passes through the mill in the direction of the arrow. The reel motor 40 is provided with a current regulator 46 which functions to maintain a predetermined output load on the motor 40 thus producing a substantially constant tension on the strip 44. The other elements of the system are the same and perform the same functions as those bearing the same reference characters in the system of Fig. 1.

Figure 3:
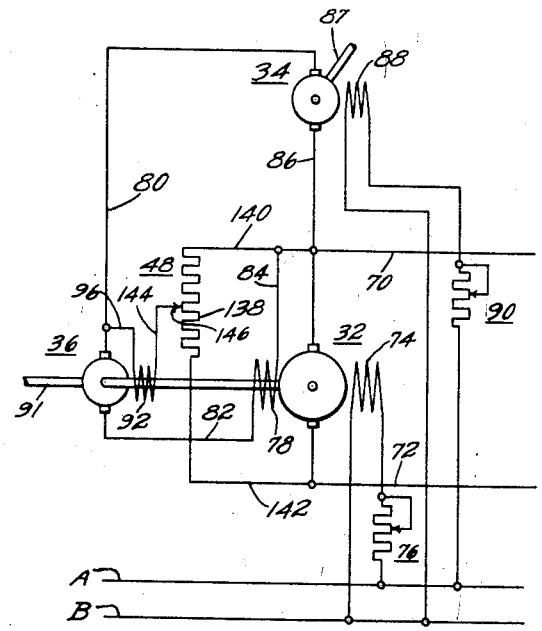

In the embodiment of the invention of Fig. 3, the generators 32, 34 and 36 function in the same general way as in the embodiments of Figs. 1 and 2 except that a potentiometer rheostat 48 is provided to selectively vary the ratio of the output potentials of the generators 32 and 34.

Figure 4:
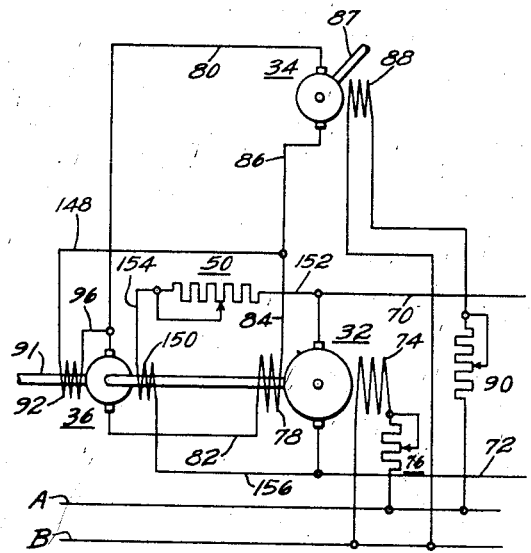

The embodiment of the invention of Fig. 4 is also similar to that of Figs. 1 and 2. In this system, however, a rheostat 50 and an auxiliary booster generator field winding are provided to perform the function of selectively varying the ratio of the output potentials of the generators 32 and 34.

Figure 5:
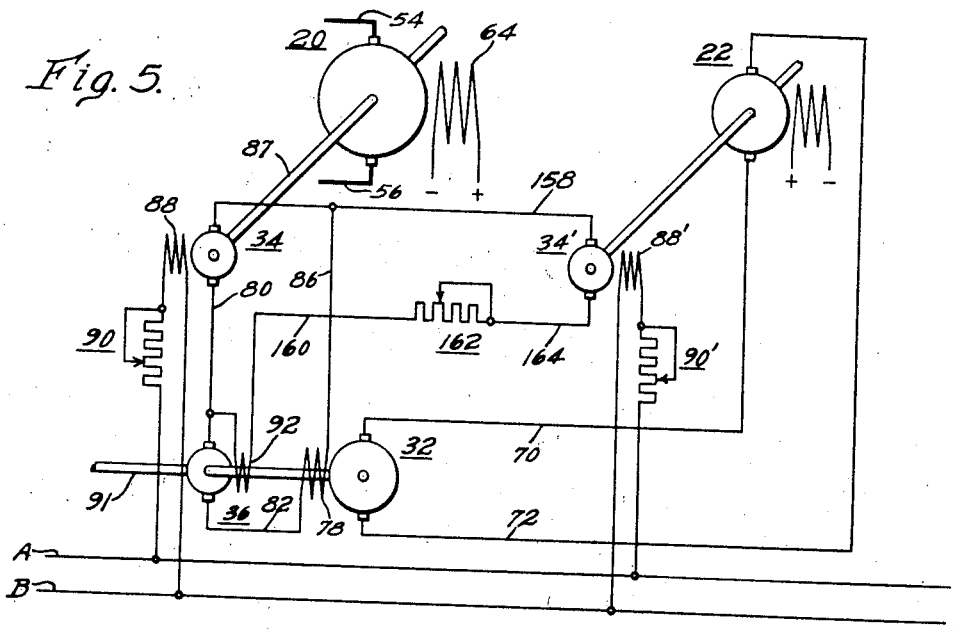

In the embodiment of the invention of Fig. 5, the booster generator 36 is excited in accordance with the difference between the potential of the pilot generator 34 and that of a pilot generator 34' driven by the table roll motor 22.

Figure 6:
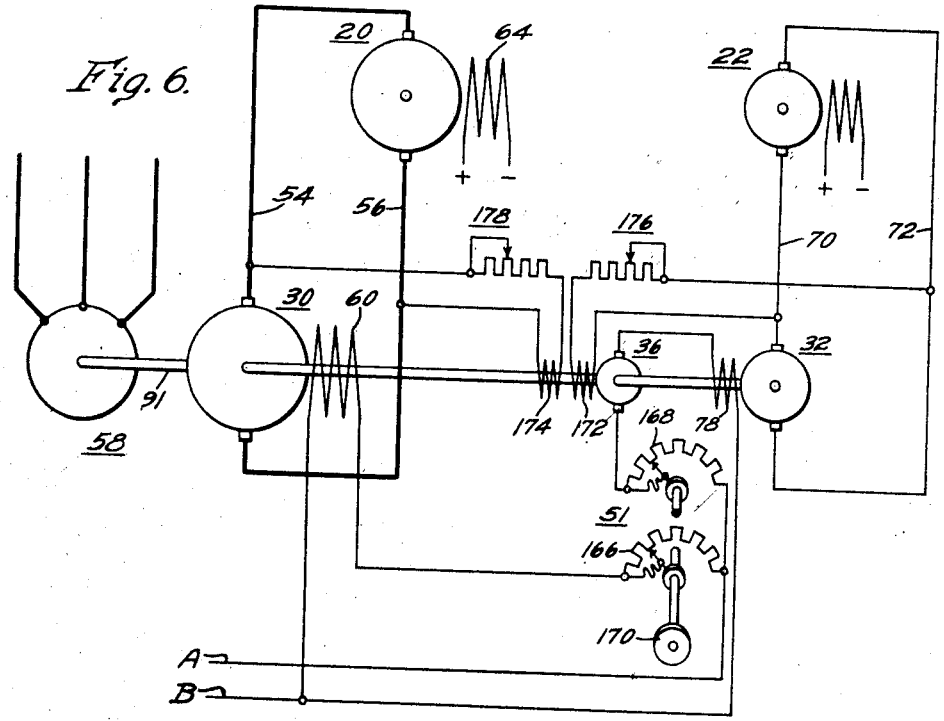

The embodiment of the invention shown in Fig. 6 provides for simultaneous adjustment of the field energization of the main generator 30 and the generator 32 which energizes the reel motor or the table roll motors, by means of a rheostat 51. The pilot generator 36 is excited in accordance with the difference in the output potentials of the generators 30 and 32.

It is to be understood that the systems shown in Figs. 3, 4 and 5 may be substituted for the corresponding elements in the system of Fig. 1, that the system of Fig. 6 may be substituted for the corresponding elements of Figs. 1 and 2, that the systems of all of the figures may be used to control analogous parts of other similar work devices, and that any operative sub-combination of any of the embodiments of the invention may be used in other systems where its function as herein described may be utilized.

Referring again to Fig. 1 of the drawings, the rolls 10 of the mill are driven by the motor 20 to act upon the slab 52, passing it through the mill in the direction shown by the arrow. The motor 20 is energized by the generator 30 through the conductors 54 and 56. The generator 30 is continuously driven by synchronous motor 58 or any other suitable driving means. The field winding 60 of the generator 30 is connected through a rheostat 62 to any suitable source of direct current power indicated by the conductors A—B. The rheostat 62 may be adjusted to vary the excitation and, therefore, the output potential of the generator 30. This variation of the armature potential of the motor 20 will vary the speed of the motor 20.

The field winding 64 of the motor 20 is connected through a rheostat 68 to the conductors A—B. The base speed or normal speed range of the motor 20 may be varied by varying its excitation by the adjustment of the rheostat 68.

The table roll motors 22, 24, 26 and 28 have their armatures connected in parallel circuit relation to be energized by the generator 32 through the conductors 70 and 72. The excitation of the generator 32 may be varied by adjusting the current flow in its field winding 74 by means of a rheostat 76. The generator 32 is provided with another field winding 78 which is connected to be energized by the output potentials of the pilot generator 34 and the booster generator 36. The circuit for the field winding 78 extends from one side of the pilot generator 34 through the conductor 80, the booster generator 36, the conductor 82, the field winding 78, and the conductors 84 and 86 to the other side of the pilot generator 34.

The pilot generator 34 is provided with a field winding 88 which is connected in series circuit relation with a rheostat 90 to the conductors A—B. The generators 32 and 36 may be continuously driven by the motor 58 through an extension of its shaft 91. The booster generator 36 is provided with a field winding 92 which is energized in accordance with the difference in the output potentials of the generators 32 and 34, the field winding 92 being connected by conductor 94 to one side of the generator 32 and by conductors 96 and 80 to one side of the pilot generator 34 and the other side of the generators 32 and 34 being connected together by the conductor 86.

In the operation of the system of Fig. 1, the excitations of the motors 20, 22, 24, 26 and 28 may be so adjusted as to provide the desired speed ranges of these motors. The output potential of the pilot generator 34 will be adjusted by means of rheostat 90, and the output potential of the generator 32 will be adjusted by the rheostat 76 to provide the desired relation between these potentials to establish such a speed relation between the motors 20, 22, 24, 26 and 28 as will result in equal peripheral speeds of the rolls 10 and the table rolls 12, 14, 16 and 18. It will be seen that the output potential of the pilot generator 34 will vary directly with the speed of the motor 20 since the pilot generator 34 is driven by the extension of the shaft 87 of the motor 20.

As the speed of the motor 20 is varied by varying the excitation of the generator 30, the pilot generator 34 will vary the potential applied to the field winding 78 of the generator 32 to thus vary the output potential of the generator 32 and vary the speeds of the motors 22, 24, 26 and 28 accordingly.

However, the size of the generator 32 is such that its field winding 78 has a considerable inductance, and there will be a time lag between the change of the potential applied to the field winding 78 due to the change of the output potential of the pilot generator 34 and the corresponding change in the excitation of the generator 32 to produce a corresponding change in the output potential of the generator 32.

During the interval of this time lag the output potential of the pilot generator 34 will increase faster than the output potential of the generator 32, and there will thus be a corresponding change in the difference in these potentials. Since the booster generator 36 is connected to be excited in accordance with the difference of the potentials of the generators 32 and 34, the output potential of the booster generator 36 will be increased thus causing an increase in the potential applied to the field winding 78 to "force" the field winding 78 by applying to it a higher potential than that necessary to provide the current flow in the field winding 78 corresponding to the desired new output potential of the generator 32. Thus, the booster generator 36 will function to compensate for the time lag due to the inductance of the field winding 78 by applying an extra potential to this field winding proportional to this time lag, and this will result in a more nearly simultaneous increase of the output potentials of the pilot generator 34 and the generator 32 and accordingly the simultaneous proportional changes in the speeds of the motor 20 and the motors 22, 24, 26 and 28.

In the embodiment of the invention shown in Fig. 2, the control system is shown operating to maintain the desired speed relations between the roll motor 20 and the reel motor 40 in a strip rolling mill. The reel motor 40 is energized by the output potential of the generator 32, and, in addition, there is provided a constant current regulator 46 for maintaining a constant power output of the motor 40 for a given speed of the motor 40 to thus maintain a substantially constant tension upon the strip 44 as it is wound on the reel 42. The field winding 98 of the motor 40 is connected through a rheostat 100 and a resistor 102 to the conductors A—B.

The regulator 46 comprises a fixed core element 104 having a winding 106 associated therewith connected to the conductors A—B in series circuit relation with a rheostat 108. A movable armature 110 is positioned to cooperate with the core element 104 and has associated with it a winding 112. The coaction of the armature 110 under the influence of the winding 112 with the core element 104 is such as to cause the armature 110 to move downward against the biasing tension of the spring element 114. The armature 110 is attached to a pivoted arm 116 upon one end of which there is mounted a movable contact element 118. The movable contact element 118 cooperates with a fixed contact element 120 to close a shunting circuit for the resistor 102 through the conductors 122 and 124 as indicated. The winding 112 is energized in accordance with the armature current of the motor 40 by connecting it to be influenced by the potential drop across the series field winding 126 of the motor 40 in a circuit which extends from one side of the field winding 126 through the conductor 128, a rheostat 130, conductor 134, the winding 112 and a conductor 136 to the other side of the winding 126.

In the operation of the regulator 46, when the armature current of the motor 40 tends to increase beyond a predetermined amount, the increased energization of the winding 112 will cause the movable contact element 118 to engage the contact element 120 to close the shunting circuit for the resistor 102, thus increasing the excitation of the motor 40 and tending to decrease its speed. Upon sufficient decrease in the power output of the motor 40 due to its tendency to decrease its speed, the contact elements 118 and 120 will be disengaged to decrease the excitation of the motor 40 and tend to increase its speed. These changes will occur rapidly and there will be a substantially continuous vibration of the arm 116, the relative intervals of engagement and disengagement of the contact element 118 with the contact element 120 depending upon the armature current of the motor 40. Thus, the control system will vary the potential applied to the motor 40 in accordance with the potential applied to the armature of the motor 20 to maintain the desired speed relation between these motors and the regulator 46 will vary this speed relation in accordance with the build-up of the strip on the reel 42 to maintain a substantially constant tension on the strip 44.

The embodiment of the invention shown in Fig. 3 functions in substantially the same way as that in Figs. 1 and 2 in maintaining the desired relationship between the output potentials of the pilot generator 34 and the generator 32, with a somewhat different method of exciting the booster generator 36. In this instance a potentiometer rheostat 48 is provided comprising a resistor 138 connected by means of the conductors 140 and 142 to be energized in accordance with the output potential of the generator 32. The field winding 92 of the booster generator 36 is connected by conductors 96 and 80 to one side of the pilot generator 34 and by the conductor 144 to the movable contact element 146 of the potentiometer rheostat 48. This circuit arrangement permits the energization of the field winding 92 in accordance with the difference between the output potential of the pilot generator 34 and the potential drop in the resistor 138 between the contact element 146 and the conductor 140. Thus, the whole output potential of the generator 32 is not being compared with the output potential of the pilot generator 34 as in the embodiment of the inventions in Figs. 1 and 2 but only a selected portion of the output potential of the generator 32 is utilized. In this way the relative output potentials of the generators 34 and 32 may be varied by the adjustment of the contact element 146 of the potentiometer rheostat 48. Thus, if it is desired to change the speed relations of the associated motors, the system of Fig. 3 is used in connection with the rolling mills as shown in Figs. 1 and 2, the potentiometer rheostat 48 may be adjusted by the proper positioning of the contact element 146 to produce the necessary output potential of the generator 32 to provide the armature energization of the reel motor or table roll motors for producing the desired speed ratio between these motors and the roll motor which drives the pilot generator 34.

In the embodiment of the invention shown in Fig. 4, a still different method of exciting the booster generator 36 is provided. The field winding 92 is connected by means of the conductors 96 and 148 to be energized in accordance with the output potential of the pilot generator 34. The booster generator 36 is provided with a second field winding 150 which is connected to be energized in accordance with the output potential of the generator 32 in a circuit which extends from one side of the generator 32 through a conductor 152, the rheostat 50, conductor 154, the field winding 150, and the conductor 156 to the other side of the generator 32. The field windings 92 and 150 of the booster generator 36 are connected to oppose each other, thus providing an excitation for the booster generator 36 proportional to the difference in the output potentials of the pilot generator 34 and the generator 32. In this system, the relative values of the output potentials of the generators 32 and 34 may be varied by adjustment of the rheostat 50 to thus adjust the net excitation of the booster generator 36 for a given output potential of the generator 32.

In the embodiment of the invention shown in Fig. 5, the pilot generator 34' is driven by the table roll motor 22 and has its field winding 88' connected for continuous energization through a rheostat 90' to the conductors A—B, as indicated. The armature of the pilot generator 34' is connected with its polarity opposing that of the pilot generator 34 in a series circuit extending from one side of the armature 34' through a conductor 158, the armature of the pilot generator 34, conductor 80, the field winding 92 of the booster generator 36, conductor 160, a rheostat 162 and conductor 164 to the other side of the pilot generator 34'. With this circuit it will be seen that the field winding 92 of the booster generator 36 will be energized in accordance with the difference between the output potentials of the pilot generators 34 and 34' and the output potential of the booster generator 36 will also vary in accordance with this difference. Since the output potentials of the pilot generators 34 and 34' are proportional to the speeds of the motors 20 and 22, any variation from the desired relative speeds of the motors 20 and 22 will be compensated for by a corresponding variation of the excitation of the generator 32, thus adjusting the speed of the motor 22 by adjustment of its armature potential.

In the embodiment of the invention of Fig. 6, simultaneous variation of the speeds of the motors 20 and 22 is provided by the actuation of the rheostat 51 to vary the energization of the generators 30 and 32 which energize the armatures of the motors 20 and 22, respectively. The rheostat 51 comprises a variable resistor 166 connected in the energizing circuit of the field winding 60 of the generator 30 and a variable resistor 168 connected in the energizing circuit of the field winding 78 of the generator 32. The variable resistors 166 and 168 are mechanically connected to be simultaneously actuated by an operating handle 170.

The booster generator 36 is also connected in circuit with the field winding 78 of the generator 32 and has field windings 172 and 174. The field winding 172 is connected to be energized by the output potential of the generator 32 in series with an adjusting rheostat 176. Similarly, the field winding 174 is connected to be energized by the output potential of the generator 30 in series circuit with an adjusting rheostat 178. The field windings 172 and 174 are connected to oppose each other, so that the net excitation of the booster generator 36 will vary in accordance with the difference in the output potentials of the generators 30 and 32.

In the operation of this embodiment of the invention, when it is desired to change the speed of the motors 20 and 22, the rheostat 51 is operated, as hereinbefore described, to vary the energization of the field windings of the generators 30 and 32 and to thus vary their output potentials. If, however, due to the inductances of the field windings 60 and 78, the output potentials of the generators 30 and 32 do not vary corresponding amounts, the variation of the difference of these potentials will cause a variation in the excitation of the booster generator 36 which, in turn, will vary the energization of the field winding 78 of the generator 32 to thus "force" the field of this generator to compensate for the variation in the difference in the potentials of the generators 30 and 32.

It will be seen that I have provided a control system for a plurality of work devices which shall function to maintain a desired speed relation between the work devices regardless of the acceleration and deceleration of the devices, which may be adjusted as desired to vary such speed relations, and which shall be simple in operation and inexpensive to manufacture, install and maintain.

In compliance with the requirements of the patent statutes, I have shown and described herein the preferred embodiments of my invention. It is to be understood, however, that the invention is not limited to the precise constructions shown and described but is capable of modification by one skilled in the art, the embodiments herein shown being merely illustrative of the principles of my invention.

I claim as my invention:

1. In a control system for maintaining a predetermined relation between the output potentials of two generators, a motor, means connecting the armature of said motor to be energized by one of the generators so that the speed of the motor will be proportional to the output potential of the one generator, means providing a first excitation potential for the other generator proportional to the speed of said motor, and means providing a second excitation potential for the other generator proportional to the difference between the first excitation potential and the output potential of the other generator.

2. In a control system for a plurality of motors, a main generator connected to energize the armatures of certain of the motors, means providing a first excitation potential for said main generator proportional to the speed of another of the motors, a booster generator providing a second excitation potential for said main generator, and means exciting said booster generator in accordance with the difference between said first excitation potential and the output potential of said main generator.

3. In a control system for a pair of motors, a main generator connected to energize the armature of one of the motors, means providing a first excitation potential for said main generator proportional to the speed of the other of said motors, a booster generator providing a second excitation potential for said main generator, and means exciting said booster generator in accordance with the difference between the output potential of said generator and said excitation potential.

4. In a control system for maintaining a predetermined proportion between the output potentials of two generators, a motor, means connecting the armature of said motor to be energized by one of the generators so that the speed of the motor will be proportional to the output potential of the one generator, means providing a first excitation potential for the other generator proportional to the speed of said motor, a booster generator providing a second excitation potential for the said other generator, and means controlling the output potential of said booster generator in accordance with the difference between the output potential of the said other generator and said first excitation potential.

5. In a control system for maintaining a predetermined speed relationship between a pair of motors, a generator connected to energize the armature of one of the motors, means providing a first excitation potential for said generator proportional to the speed of the other of the motors, means providing a second excitation potential for said generator proportional to the difference between the output potential of said generator and said first excitation potential, and means for selectively varying the value of said second excitation potential per unit of difference between said generator output potential and said first excitation potential to thereby vary the speed relationship between the motors.

6. In a control system for maintaining a predetermined proportion between the output potentials of two generators, a motor, means connecting the armature of said motor to be energized by one of the generators so that the speed of the motor will be proportional to the output potential of the one generator, means providing a first excitation potential for the other generator proportional to the speed of said motor, means providing a second excitation potential for the other generator proportional to the difference between the first excitation potential and the output potential of the said other generator, and means for selectively varying the value of said second excitation potential per unit of difference between said generator output potential and said first excitation potential to thereby vary the proportion between the output potentials of the two generators.

7. In a control system for maintaining a predetermined speed relationship between a pair of motors, a generator connected to energize the armature of one of the motors, means providing a first excitation potential for said generator proportional to the speed of the other of the motors, means providing a second excitation potential for said generator proportional to the difference between the output potential of said generator and said first excitation potential, and means for selectively varying the proportion between the speed of the said other motor and said first excitation potential to thereby vary the speed relationship between the motors.

8. In a control system for a pair of generators, a booster generator, circuit means connecting said booster generator and one of the pair of generators to provide excitation potential for the other of the pair of generators, a potentiometer rheostat connected to be energized by the output potential of the said other generator, and means controlling the output potential of said booster generator in accordance with the difference between the output potential of the said one of the generators and the potential drop across a selected portion of said potentiometer rheostat.

9. In a control system for a pair of generators, a booster generator, circuit means connecting said booster generator and one of the pair of generators to provide excitation potential for the other of the pair of generators, a first excitation circuit for said booster generator connected to be energized in accordance with the output potential of the said one generator, a second excitation circuit for said booster generator connected to be energized in accordance with the output potential of the said other generator, and means for selectively varying the effective resistance of one of said first and second excitation circuits.

10. In a control system for maintaining the desired ratio between the speeds of associated motors of a rolling mill, a pilot generator driven by one of the motors providing a pilot generator potential proportional to the speed of the said one motor, a main generator connected to energize the armatures of the other motors, a booster generator, circuit means connecting said pilot generator and said booster generator to provide excitation potential for said main generator, a first excitation circuit for said booster generator connected to be energized in accordance with the output potential of said pilot generator, a second excitation circuit for said booster generator connected to be energized in accordance with the output potential of said main generator, and means for selectively varying the effective resistance of one of said first and second excitation circuits.

11. In a control system for maintaining the desired ratio between the speeds of associated motors of a rolling mill, a pilot generator driven by one of the motors providing a pilot generator potential proportional to the speed of the said one motor, a booster generator, a main generator connected to energize the armatures of the other motors, circuit means connecting said pilot generator and said booster generator to provide excitation potential for said main generator, a potentiometer rheostat connected to be energized by the output potential of said main generator, and means controlling the output potential of said booster generator in accordance with the difference between the output potential of said pilot generator and the potential drop across a selected portion of said potentiometer rheostat.

12. In a control system for maintaining the desired ratio between the speeds of the roll drive motor and the reel motor of a strip rolling mill, in combination, a pilot generator driven by the roll motor providing a pilot generator voltage proportional to the roll motor speed, a booster generator, a main generator connected to energize the armature of the reel motor, means connecting said main generator to be excited by the potentials of said pilot generator and said booster generator, means exciting said booster generator in accordance with the difference between the output potentials of said pilot generator and said main generator, and regulating means for maintaining a substantially constant reel motor power output.

13. In a control system for a pair of motors, a main generator for each motor connected to energize the armature of each of the motors, a booster generator connected in circuit with the field winding of one of said main generators, and means controlled by the output potentials of the main generators for exciting said booster generator.

14. In a control system for a pair of generators, a booster generator, means providing energization of the field winding of one of the pair of generators proportional to the sum of the output potential of the other generator and the booster generator, and means exciting said booster generator in proportion to the difference between the output potentials of the pair of generators.

15. In a control system for a pair of motors, a main generator connected to energize one of the motors, a pilot generator driven by the other motor, a booster generator connected in series circuit relation with said pilot generator and the field winding of said main generator, a field winding for said booster generator connected to be energized by the potential of said main generator, and a field winding for said booster generator connected to be energized by the potential of said pilot generator.

16. In a control system for a pair of motors, a main generator connected to energize one of the motors, a pilot generator driven by the other motor, a booster generator, means connecting said booster generator, said pilot generator and the field winding of said main generator in series circuit relation, a variable resistor connected to be energized by said main generator, and a series circuit extending from the movable contact element of said variable resistor to one side of said resistor and including said pilot generator and the field winding of said booster generator.

17. In a control system for a plurality of motors, a pilot generator driven by one of the motors, a main generator connected to energize other of the motors, a booster generator having separate field windings connected to be energized by the respective main and pilot generators, and means for exciting said main generator in accordance with the potentials of said pilot and booster generators.

18. In a control system for a plurality of motors, a pilot generator driven by one of the motors, a main generator connected to energize other of the motors, a variable resistor having a movable contact element, circuit means connecting said variable resistor to be energized by one of said generators, a booster generator connected in series circuit relation with the field winding of said main generator and said pilot generator and circuit means connecting the field winding of said booster generator between one terminal of said booster generator and the movable contact element of said variable resistor.

WILLARD G. COOK.